(12) United States Patent
Persson

(10) Patent No.: US 9,969,445 B2
(45) Date of Patent: May 15, 2018

(54) TRAILER AND SIDE SKIRTS PROVIDED WITH ARRANGEMENT FOR REDUCING AIR DRAG

(71) Applicant: Creo Dynamics AB, Linköping (SE)

(72) Inventor: Andreas Persson, Linköping (SE)

(73) Assignee: Creo Dynamics AB, Linköping (SE)

( * ) Notice: Subject to any disclaimer, the term of this patent is extended or adjusted under 35 U.S.C. 154(b) by 25 days.

(21) Appl. No.: 15/116,459

(22) PCT Filed: Feb. 3, 2015

(86) PCT No.: PCT/EP2015/052160
§ 371 (c)(1),
(2) Date: Aug. 3, 2016

(87) PCT Pub. No.: WO2015/117940
PCT Pub. Date: Aug. 13, 2015

(65) Prior Publication Data
US 2017/0008576 A1    Jan. 12, 2017

(30) Foreign Application Priority Data
Feb. 7, 2014 (SE) ..................... 1450133

(51) Int. Cl.
B62D 35/00    (2006.01)
(52) U.S. Cl.
CPC .......... B62D 35/001 (2013.01); B62D 35/008 (2013.01)
(58) Field of Classification Search
CPC ...................... B62D 35/001; B62D 35/008
(Continued)

(56) References Cited

U.S. PATENT DOCUMENTS 4,192,522 A * 3/1980 Morgan ............... B62D 25/168
                                                           280/851
4,585,242 A   4/1986 Sparks
(Continued)

FOREIGN PATENT DOCUMENTS

EP    1508510    2/2005
FR    2858796    2/2005
(Continued)

OTHER PUBLICATIONS

The International Preliminary Report on the Patentability dated Aug. 9, 2016, in PCT/EP2015/052160.
(Continued)

*Primary Examiner* — Pinel E Romain
(74) *Attorney, Agent, or Firm* — Hovey Williams LLP

(57) ABSTRACT

A trailer (10) and a side skirt (19), each comprising an integrated arrangement (60, 70, 80) for reducing air drag, are provided. Each arrangement (60, 70, 80) comprises means for receiving air (60) comprising at least one air inlet (6), means for ejecting air (70) comprising at least one air outlet (7) facing downwards. The means for ejecting air (70) are arranged along a lower edge (11) of the trailer cargo housing (16) and side skirt (19) respectively. The arrangement also comprises means for conveying air (80) comprising at least one air duct (8). The means for conveying air (80) extend between the air receiving means (60) and the air ejecting means (70). The arrangement (60, 70, 80) is configured to produce a screen of air from the lower edge (11) and downwards during travel. The air screen prevents air, especially side wind, from entering the undercarriage. Especially the arrangement (60, 70, 80) in the cargo housing (16) prevents air from entering in the gap between the truck and trailer at the connection (17) between the truck and trailer, (Continued)

and the arrangement of the side skirt (19) prevents air from entering in the gap between the side skirt (19) and the road.

34 Claims, 4 Drawing Sheets

(58) Field of Classification Search
USPC .................................................... 296/180.4
See application file for complete search history.

(56) References Cited

U.S. PATENT DOCUMENTS

| | | | |
|---|---|---|---|
| 4,673,206 A | | 6/1987 | Kretschmer et al. |
| 5,277,444 A | | 1/1994 | Stropkay |
| 5,379,218 A | | 1/1995 | Jacobi et al. |
| 7,093,889 B2* | 8/2006 | Graham | ............... B62D 35/001 |
| | | | 296/180.1 |
| 7,364,220 B2* | 4/2008 | Shahbazi | ............... B62D 35/00 |
| | | | 296/180.1 |
| 7,740,303 B2* | 6/2010 | Wood | .................. B62D 35/001 |
| | | | 296/180.1 |
| 7,794,011 B2 | | 9/2010 | Kjellgren et al. |
| 2005/0161269 A1 | | 7/2005 | Khalighi et al. |
| 2010/0201152 A1 | | 8/2010 | Smith |
| 2011/0148142 A1 | | 6/2011 | Kint |
| 2012/0153668 A1 | | 6/2012 | van Raemdonck |
| 2013/0270857 A1 | | 10/2013 | Brown et al. |
| 2014/0125088 A1* | 5/2014 | Wiegel | ................. B62D 35/001 |
| | | | 296/180.4 |
| 2016/0121940 A1* | 5/2016 | Courtney | ............. B62D 35/001 |
| | | | 296/180.4 |
| 2016/0214661 A1* | 7/2016 | Knobloch | ............ B62D 35/001 |

FOREIGN PATENT DOCUMENTS

| | | |
|---|---|---|
| GB | 2219974 | 12/1989 |
| WO | 0136255 | 5/2001 |
| WO | 2013084047 | 6/2013 |

OTHER PUBLICATIONS

The International Search Report and Written Opinion dated Apr. 24, 2015, in PCT/EP2015/052160.

* cited by examiner

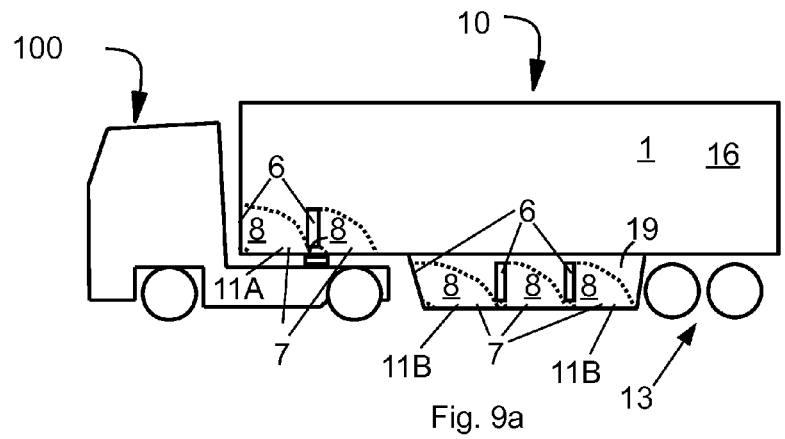
Fig. 9a
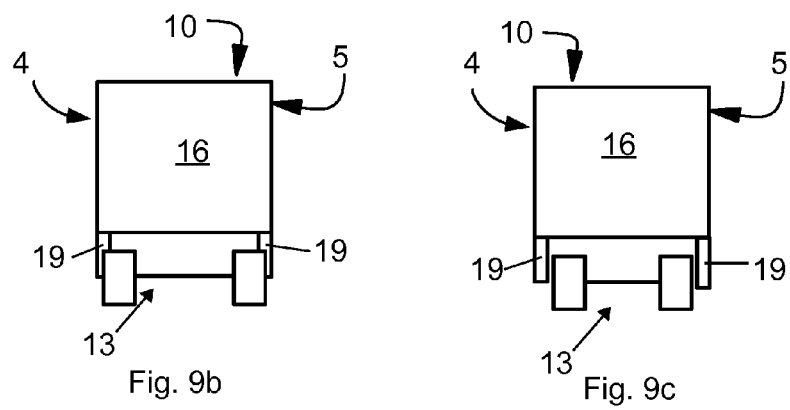
Fig. 9b
Fig. 9c
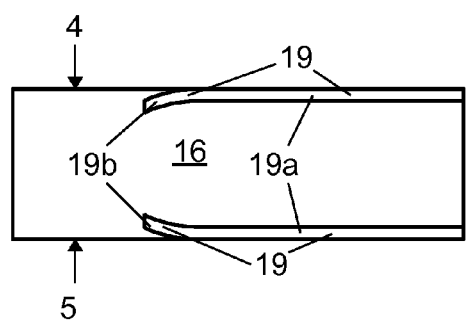
Fig. 9d

TRAILER AND SIDE SKIRTS PROVIDED WITH ARRANGEMENT FOR REDUCING AIR DRAG

RELATED APPLICATIONS

This is a national stage application under 35 U.S.C. § 371 of International Application PCT/EP2015/052160, filed Feb. 3, 2015, which claims the benefit of Swedish Patent Application No. 1450133-2, filed Feb. 7, 2014, both of which are incorporated by reference herein in their entireties.

TECHNICAL FIELD

The invention relates to vehicles, in particular a trailer for a truck, provided with an arrangement for reducing air drag. Especially, the means for reducing air drag is arranged for counteracting side wind from interfering with the trailer body. The invention also relates to side skirts provided with an arrangement for reducing air drag of a trailer.

BACKGROUND AND PRIOR ART

Many land vehicles, such as cars and trucks, are shaped to exert a low wind drag when travelling. A specific problem is the influence of cross wind or side wind.

U.S. Pat. No. 5,379,218 ('218) concerns the influence of side wind on the steering of the vehicle. The arrangement described in '218 includes means for detecting side wind by differential pressure detection and is provided with means of two pressure sensors on each side of the vehicle. When side wind is detected, the arrangement of '218 automatically counteracts the effect on the steering by adjusting the steering based on the detected side wind, i.e. based on the determined pressure difference.

One further problem especially concerns trucks provided with trailers, which may suffer from a large drag due to the influence of side wind. Side wind may enter through gaps between the truck and trailer, and between trailer and ground respectively. This creates increased aerodynamic drag since the air interacts with components arranged on the undercarriage at the underside of the trailer, causing increased turbulence around the vehicle. Even if the truck is aerodynamically shaped for low drag, the underside of the trailer is vulnerable to wind influences and such influence is not counteracted by aerodynamic design of the truck alone.

US 2013/0270857 ('857) describes a side skirt wall for preventing air flow from entering under the chassis of a trailer. The side skirt wall is designed for reducing the air drag resulting from an air flow entering and interacting with the undercarriage components of the vehicle. The side skirt is attached to a lower edge of a side wall of the trailer.

US 2011/0148142 ('142) describes an aerodynamic device for a vehicle with trailer. The aerodynamic device provides side skirts (9 in '142) to the trailer and is provided with air ducts (15, 20, 22) for directing an air flow along the side wall of the side skirt towards the rear side of the trailer preventing drag-inducing whirls behind the vehicle. The aerodynamic device is attached to a lower edge of a trailer side wall.

Both the side skirts described in '857 and '142 provide reduced drag during side wind conditions, compared to a vehicle without side skirts.

However, due to the need for ground clearance of the trailer, the side skirts may not extend fully down to the surface of the road. A drawback with the side skirt systems described in '857 and '142 is therefore that, side wind may still enter in the space between the side skirts and the road surface.

US 2010/0201152 ('152) describes a side deflector assembly for reducing air drag of a vehicle that comprises a truck and a trailer, especially preventing side wind from entering a vertical gap between the truck and the trailer. The assembly comprises a control system that includes a side wind sensor to independently extend side deflectors arranged on opposing sides of the vehicle.

A drawback with the assembly of '152 is that the side deflectors extend laterally from the vehicle, making the vehicle wider. A wider vehicle may be a safety risk, for example to bypassing vehicles. Also, a further disadvantage with the assembly of '152 is that the side deflectors only prevents air from interfering with the front side of the trailer and does not prevent air from interfering with the undercarriage of the trailer.

SUMMARY OF THE INVENTION

An aim of the invention is to overcome the drawbacks with the prior art having improved capability of preventing air drag originating from the underside of the vehicle, especially the undercarriage of a trailer.

For this purpose, the invention provides a trailer for a truck, and a side skirt for a trailer.

According to a first aspect of the invention, the invention provides a trailer for a truck. The trailer comprises a body having a first side and a second side. The first side and the second side are essentially vertical and extends in the longitudinal direction of the body. The trailer also comprises an arrangement for reducing air drag integrated in the body. The arrangement for reducing air drag comprises means for receiving air comprising at least one air inlet; and means for ejecting air comprising at least one air outlet facing downwards. The means for ejecting air are arranged along a lower edge of one of the sides of the body. The arrangement for reducing air drag also comprises means for conveying air comprising at least one air duct. The means for conveying air extend between the air receiving means and the air ejecting means and provides at least one air passage from the air receiving means to the air ejecting means. The arrangement for reducing air drag is configured to produce a screen of air from the lower edge and downwards during travel.

In an embodiment of this aspect of the invention, at least one air outlet of the means for ejecting air is designed as an elongated slot extending in the longitudinal direction of the body. In this way the screen of air may cover a longer portion of the body.

In an embodiment of this aspect of the invention, the trailer comprises a truck connection and the means for ejecting air are arranged along a first portion of the lower edge, which first portion extends at the side of and above the truck connection. This prevents airflow from entering the gap between the truck and trailer and impinge on the front part of the trailer undercarriage, which is a contributor to drag for many vehicles.

In an embodiment of this aspect of the invention, the means for ejecting air extends a distance of between 1 m and 3 m along the first portion in the longitudinal direction of the body, and/or has an outlet width of less than 10 cm in the lateral direction of the body. In an embodiment, the width is between 0.5 cm and 5 cm, or preferably between 2 and 4 cm in the lateral direction of the body. A longer slot can be used to create an air screen that covers and screens off a larger part of the gap, however ejecting air over a longer distance requires a larger amount of air. Due to the limited supply of free-stream air, it can be beneficial to arrange the means for ejecting air only in the most crucial area of the gap at the truck connection. Limiting the slot length will then provide a higher energy screen of air in the covered area. An air ejecting width that is small enables a higher exit velocity of the air, but the width should be large enough to provide a sufficient amount of air without creating excessive flow losses through the duct.

In an embodiment of this aspect of the invention, the means for ejecting air comprises a plurality of air outlets designed as elongated slots, and wherein the plurality of air outlets are arranged in sequence along the first portion. The individual air outlets formed as slots contributes to a controlled flow of air, and arranging them in sequence provides air ejections over a long distance, still with a controlled air flow.

In an embodiment of this aspect of the invention, the body comprises a cargo housing and a side skirt arranged below the cargo housing and wherein the means for ejecting air are arranged along a second portion of the lower edge, which second portion is provided in the side skirt. This prevents an airflow from entering between the side skirt of the trailer and ground and impinge on the rear part of the trailer undercarriage.

In an embodiment of this aspect of the invention the trailer comprises at least one wheel arrangement, and the means for ejecting air extends along the second portion a distance of at least 1 m in front of the at least one wheel arrangement in the longitudinal direction of the body. By ejecting air downward in front of the wheel arrangements, an air drag caused by air stagnation against the wheels, and the wheel arrangements, is reduced.

In an embodiment of this aspect of the invention, the trailer comprises at least one wheel arrangement, the side skirt is arranged on the outer side of the at least one wheel arrangement, and the second portion extends outside at least one wheel of the at least one wheel arrangement. Preferably, the side skirt and the second portion extends outside the rearmost wheel of the wheel arrangement. Having the side skirt extending outside the wheels is a way to reduce air drag, and air ejecting outside the wheels enhances the drag reducing function of the side skirt.

In a preferred embodiment, the means for ejecting air extends a distance of more than 50% of the length of the side skirt in the longitudinal direction of the body.

In a preferred embodiment, the means for ejecting air extends a distance of more than 80% of the length of the side skirt in the longitudinal direction of the body.

A longer slot creates a better coverage, but the velocity of the ejected air will be lower. The length may be varied to find an optimum length dependent on the particular design of the trailer.

In an embodiment of this aspect of the invention, the means for ejecting air has an outlet width of less than 10 cm, preferably between 0.5 cm and 5 cm, in the lateral direction of the body. In an embodiment, the width is between 2 cm and 4 cm. The width should be small to provide sufficient ejection speed of the air flow, yet wide enough for avoiding excessive flow resistance and to provide a sufficient mass flow.

In an embodiment of this aspect of the invention, the means for ejecting air comprises a plurality of air outlets designed as elongated slots, and wherein the plurality of air outlets are arranged in sequence along the second portion. In this way a better control of the air flow can be achieved over a longer distance along the trailer.

In an embodiment of this aspect of the invention, the means for receiving air comprises a plurality of air inlets, the means for conveying air comprises a plurality of air ducts, and wherein each one of the air ducts is arranged to provide an air passage from a respective one of the air inlets to a respective one of the air outlets. Such an arrangement facilitates a larger total volume of air to be ejected from the air ejecting means.

In an embodiment of this aspect of the invention, the trailer comprises a truck connection, and the body comprises a cargo housing and a side skirt, which side skirt is arranged below the cargo housing. In this embodiment the means for ejecting air are arranged along a first portion and along a second portion of the lower edge, which first portion extends above and alongside the truck connection and which second portion is provided in the side skirt. Such a combination provides a covering for both the horizontal gap between truck and trailer and the gap between side skirt and the ground. The design of the individual drag reducing arrangements when used in combination may be the same as when used separately.

In an embodiment of this aspect of the invention, at least one air duct of the means for conveying air has a constant width in the lateral direction of the body and the width of at least one air outlet of the means for ejecting air is equal to the width of the air duct, so that an air passage of constant width is provided.

In an embodiment of this aspect of the invention, at least a main portion of at least one air duct of the means for conveying air, has a constant width in the lateral direction of the body, and the width of at least one air outlet of the means for ejecting air is smaller than the width of the main portion, so that a narrowing air passage is provided. A narrowing increases the speed of the ejected air, leading to an air screen extending longer in the vertical direction and provides an improved covering of the gap.

In an embodiment of this aspect of the invention, a transition portion is provided between the main portion and the at least one air outlet having a width smaller than the main portion. Such a transition portion contributes to a smoother and less turbulent air passage.

In an embodiment of this aspect of the invention, the at least one air inlet is provided with a valve, and said trailer comprising means for adjusting the valve, which valve adjusting means are operably connected to the valve and arranged to selectively admit air to enter into and flow through the air duct. To selectively use the air drag reducing arrangement makes it possible to use it mainly at the windward side of the vehicle. For example, the inlet or inlets on the leeward side may selectively be closed to avoid air drag induced from receiving, conveying and ejecting air, since the positive effect of ejecting air is lesser on the leeward side than on the windward side.

In an embodiment of this aspect of the invention, the valve adjusting means is adapted to control the valve as a response to an indication of side wind provided by a wind sensing arrangement. Using a wind sensing arrangement makes it possible to control the arrangement automatically by means of the valve adjusting means being adapted for input from the wind sensing arrangement.

In an embodiment of this aspect of the invention, the valve adjusting means are adapted to open the valve when wind sensing arrangement indicates that the air inlet is located at the windward side of the trailer.

In an embodiment of this aspect of the invention, the valve adjusting means is adapted to partly open the valve when the wind sensing arrangement indicates that the side wind exceeds a pre-defined first threshold angle.

In an embodiment of this aspect of the invention, the valve adjusting means is adapted to fully open the valve when the wind sensing arrangement indicates that the side wind exceeds a pre-defined second threshold angle. The optimum amount of air that should be fed through the ducts can vary depending on side wind angle. By gradually opening the valves, this amount of air can be closely controlled to provide an air screen large enough to achieve the desired effect, while limiting drag that is internally induced in the drag reducing arrangement.

According to a second aspect, the invention provides a side skirt for attachment below a cargo housing of a trailer to prevent air from entering below the cargo housing and create air drag when the air interferes with the undercarriage of the trailer. In this way trailers without drag reducing arrangements can easily be equipped with a side skirt having enhanced drag reducing qualities. The side skirt is provided with an arrangement for reducing air drag, which arrangement is integrated into the side skirt and comprises means for receiving air comprising at least one air inlet and means for ejecting air comprising at least one air outlet facing downwards. The means for ejecting air are arranged along a portion of a lower edge of the side skirt. The arrangement for reducing air drag also comprises means for conveying air comprising at least one air duct. The means for conveying air extends between the air receiving means and the air ejecting means and provides at least one air passage from the air receiving means to the air ejecting means. The arrangement for reducing air drag is configured to produce a screen of air during travel with the side skirt attached to a trailer, which screen of air extends from the lower edge portion towards a road surface.

By means of such a side skirt, air flow can be prevented from entering under the trailer without negatively affecting the ground clearance of the trailer more than necessary.

In a preferred embodiment of the second aspect of the invention, the means for ejecting air extends a distance of more than 50% of the length of the side skirt in the longitudinal direction of the side skirt.

In another preferred embodiment of the second aspect of the invention, the means for ejecting air extends a distance of more than 80% of the length of the side skirt in the longitudinal direction of the side skirt.

In an embodiment of the second aspect of the invention, the means for ejecting air has an outlet width of less than 10 cm, preferably between 0.5 cm and 5 cm, in the lateral direction of the side skirt.

In an embodiment, the width is between 2 cm and 4 cm.

In an embodiment of the second aspect of the invention, the means for ejecting air comprises a plurality of air outlets designed as elongated slots, and the plurality of air outlets are arranged in sequence along the lower edge portion.

In an embodiment of the second aspect of the invention, the means for receiving air comprises a plurality of air inlets and the means for conveying air comprises a plurality of air ducts. Each one of the air ducts is arranged to provide an air passage from a respective one of the air inlets to a respective one of the air outlets.

In an embodiment of the second aspect of the invention, at least one air duct of the means for conveying air has a constant width in the lateral direction of the body, and wherein the width of at least one air outlet of the means for ejecting air is equal to the width of the air duct, so that an air passage of constant width is provided.

In an embodiment of the second aspect of the invention, at least a main portion of at least one air duct of the means for conveying air, has a constant width in the lateral direction of the body, and wherein the width of at least one air outlet of the means for ejecting air is smaller than the width of the main portion, so that a narrowing air passage is provided.

In an embodiment of the second aspect of the invention, a transition portion is provided between the main portion and the at least one air outlet having a width smaller than the main portion.

In an embodiment of the second aspect of the invention, the at least one air inlet is provided with a valve, and wherein the side skirt comprises means for adjusting the valve, which valve adjusting means are operably connected to the valve and arranged to selectively admit air to enter into and flow through the air duct.

In an embodiment of the second aspect of the invention, the valve adjusting means is adapted to control the valve as a response to an indication of side wind provided by a wind sensing arrangement.

In an embodiment of the second aspect of the invention, wherein the valve adjusting means is adapted to open the valve when the wind sensing arrangement indicates that the air inlet is located at the windward side of the trailer.

In an embodiment of the second aspect of the invention, the valve adjusting means is adapted to partly open the valve when the wind sensing arrangement indicates that the side wind exceeds a pre-defined first threshold angle.

In an embodiment of the second aspect of the invention, the valve adjusting means is adapted to fully open the valve when the wind sensing arrangement indicates that the side wind exceeds a pre-defined second threshold angle.

It is preferred to integrate the means for conveying air in both the first and second sides of the body. This is an efficient way to prevent air flow from entering under the trailer from both sides, without adding an air deflecting structure onto the outside of the trailer body.

BRIEF DESCRIPTION OF THE DRAWINGS

The present invention will be described with reference to the accompanying drawings, wherein:

FIGS. 9a-d illustrates features and embodiments of the arrangement for reducing air drag according to the invention.

DESCRIPTION OF EMBODIMENTS

Figure 1:
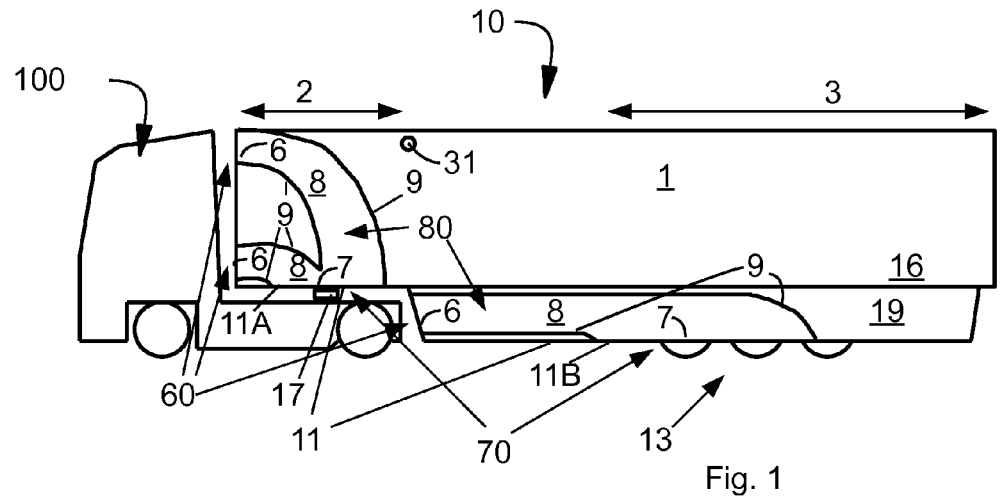
FIG. 1 illustrates a side view of a truck and trailer combination, which trailer is provided with means for reducing air drag in accordance with an embodiment of the invention.

A combination of a truck 100 and a trailer 10 is illustrated in FIG. 1. The trailer 10 comprises a body 1, a wheel arrangement 13 with three sets of wheels and a truck connection 17. The truck connection 17 is arranged in a forward section 2 of the trailer 10 body 1. The wheel arrangements 13 are arranged in a rear section 3 of the trailer 10 body 1. The body 1 comprises a cargo housing 16 and a side skirt 19. The trailer 10 also comprises an arrangement 60, 70, 80 for reducing air drag arranged inside the body 1, which arrangement comprises means for receiving air 60, means for conveying air 80 and means for ejecting air 70. The means for receiving 60 comprises inlets 6 facing forward for receiving an incoming air stream during travel. The means for ejecting air 70 comprises a plurality of air outlets 7 facing downwards to eject air towards a road surface (not illustrated) and to eject air at the gap alongside the truck connection 17 during travel. The arrangement 60, 70, 80 for reducing air drag is arranged so that the ejected air screens off the undercarriage and the horizontal space between the trailer 10 and truck 100 from influences of side wind. The air ejecting means 70 are arranged at the lower edges 11 of the body; at a first portion 11A of the lower edge 11 in the cargo housing 16 above the truck connection 17 and at a second portion 11B of the lower edge 11 of the side skirt 19.

The side skirt 19 extends in the longitudinal direction of the trailer 10 from a position close to the truck 100 to a position close to the rear end of the trailer 10. The side skirt 19 extends along and beneath the cargo housing 16 and partly covers the wheel arrangements 13 in the vertical direction. The air ejecting means 70 of the side skirt 19 extends from a position in front of the wheel arrangements 13 in the longitudinal direction of the trailer 10 to approximately the center of the last, or hindmost, wheel arrangement of the wheel arrangements 13.

The air ejection means 70 of the cargo housing 16 extends in the longitudinal direction of the trailer 10 along a portion of the front section 2 that is situated above the truck connection 17.

The means for conveying air 80 are arranged in the body 1 between the air receiving means 60 and the air ejecting means 70 and comprises a plurality of air ducts 8 arranged to convey and re-direct incoming air to the outlets 7. Each air duct 8 of the air conveying means 80 are provided with duct walls 9, which duct walls 9 are curved in a direction downwards from a substantially horizontal direction at the inlets 6 to a downward direction at the outlets 7. The last portion of the duct walls 8 may be directed substantially vertically downwards, as illustrated in FIG. 1 in the first portion 11A of the lower edge 11 at the truck connection 17. The last portion of the duct walls 9 may be directed at a small angle to the vertical direction as illustrated in the second portion 11B at the rearmost wheel of the wheel arrangements 13.

The arrangement for reducing air drag 60, 70, 80 are arranged in the cargo housing 16 as well as in the side skirt 19. In the embodiment illustrated in FIG. 1, the air receiving means 60 comprises a plurality of air inlets 6, wherein two inlets 6 can be seen arranged in a front face of the trailer and one air inlet 6 can be seen arranged in a front face of the side skirt 19. Although not shown in FIG. 1, the arrangement for reducing air drag 60, 70, 80 are symmetrically arranged in both sides of the trailer.

Figure 2:
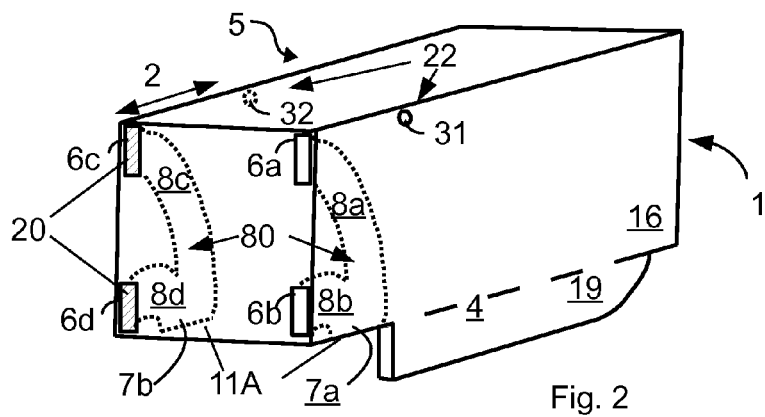
FIG. 2 is a perspective view illustrating a trailer body and means for reducing air drag according to an embodiment of the invention.
Figure 3:
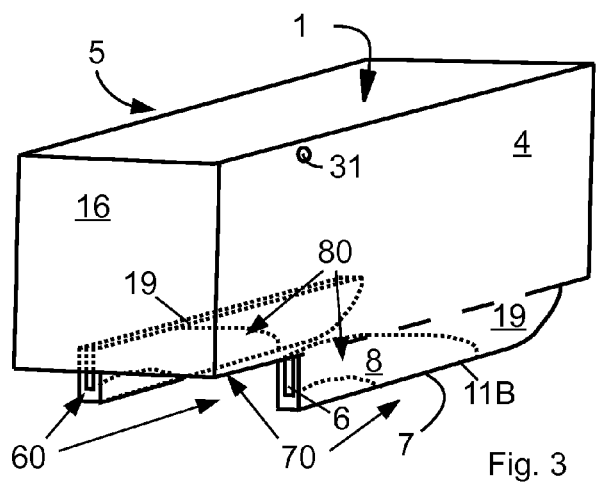
FIG. 3 is a perspective view illustrating a trailer body and means for reducing air drag according to an embodiment of the invention.

FIGS. 2 and 3 are respective perspective views illustrating some of the features of FIG. 1 and some additional features. FIGS. 2 and 3 are perspective views that show the body 1 of a trailer 10, but not the wheel arrangement 13 or the truck connection 17 of the trailer 10, and do not show the truck 100. FIGS. 2 and 3 illustrate that the means for reducing air drag 60, 70, 80 are symmetrically arranged in both sides of the trailer 10 body 1.

FIG. 2 shows the front of the body 1 in a perspective view, wherein the front face of the body 1 is provided with four inlets 6, being numbered 6a-6d. Two of the inlets 6, numbered 6a-b, are arranged in a first side 4, the left side, of the body and two of the inlets 6, numbered 6c-d, are arranged in a second side 5, the right side, of the body 1. The air conveying means 80 comprises air ducts 8, numbered 8a-d, arranged in each of the respective first and second side 4, 5. The air conveying means are indicated by broken lines in FIG. 2 and FIG. 3 to indicate that they are integrated in the body 1. The air ejecting means 70 comprises air outlets 7, numbered 7a-b, arranged in each respective first and second side 4, 5.

In FIG. 2, the body 1 is provided with a wind sensing arrangement 22 for sensing side wind, which includes a first 31 and a second 32 pressure sensor arranged in the cargo housing 16 in a respective one of the first 4 and second sides 5 of the body 1. The first pressure sensor 31 is also indicated in FIGS. 1 and 3. The wind sensing arrangement 22 can be used for selectively using the means for reducing air drag 60, 70, 80. For this purpose the air inlets 6 are provided with valves 20. Especially, upon detecting a side wind by means of the wind sensing arrangement 22, the air inlets 6 at the windward side can be opened whereas the air inlets 6 at the leeward side are closed. This is illustrated in FIG. 2, wherein the inlets 6 of the first side 4, being numbered 6a, 6b, are open, whereas the inlets 6 of the second side 5, numbered 6c, 6d are closed by means of the valves 20 covering the inlets 6 of the second side 5. The wind sensing arrangement 22 may be operatively connected to the valves 20, and in a preferred embodiment the arrangement 60, 70, 80 for reducing air drag is configured to open the valves 20 of inlets 6 at the windward side and to close the valves 20 of the inlets 6 at the leeward side.

For purpose of clarity, only the valves 20 of the second side 5 are illustrated in FIG. 2. Also, for purpose of clarity, note that, the inlets 6 of the side skirts 19 in FIGS. 1 and 3 may preferably be provided with valves 20, however this is not illustrated in the figures.

Although not illustrated in FIGS. 1 and 2, the body 1 is also provided with a second side skirt (19) in the second side 5. FIG. 3 illustrates, in broken lines, a side skirt 19 arranged in the second side 5, which side skirt 19 is provided with the same elements of the air drag reducing arrangement 60, 70, 80 as the side skirt 19 of the first side 4 is.

In FIG. 2, the inlets 6 of the air receiving means 60 are arranged in the front face of the cargo housing 16 of the body 1. The air ducts 8 of the air conveying means 80 are arranged in the cargo housing 16 above the trailer connection 17. The air ducts 8 preferably have a lateral width corresponding to the lateral width of the walls in each side 4, 5 so as not to reduce the space for cargo inside the cargo housing 16 of the trailer 10.

The air ducts 8 in the side skirts 19 (FIGS. 1 and 3) may have a wider lateral width than the walls of each side 4, 5, especially the inlets 6 of the side skirts 19 and a foremost portion of the air ducts 8. The rearmost portion of the side skirt 19 in FIGS. 1-3, and the rearmost portion of the ducts 8 in the side skirts 19 in FIGS. 1 and 3, are arranged on the outside of the wheel arrangements 13.

FIG. 1 illustrates an embodiment, wherein the means for reducing air drag 60, 70, 80 are arranged above the truck connection 17 in order to prevent air from entering between the truck 100 and trailer 10 as well as in the side skirts 19 above the road surface, in order to prevent air from entering between each side skirt 19 of the trailer 10 and the road surface into the undercarriage of the trailer 10, and to prevent air from interfering with the wheels of the wheel arrangements 13.

FIG. 2 illustrates features of the embodiment of FIG. 1, but also illustrates an embodiment wherein the means for reducing air drag 60, 70, 80 are arranged solely in the forward section of trailer 10 and integrated in the cargo housing 16 above the truck connection 17.

FIG. 3 illustrates features of the embodiment of FIG. 1, but also illustrates an embodiment, wherein the arrangement for reducing air drag 60, 70, 80 are arranged solely in the side skirts 19 of the body 1, which are configured to partly cover the wheel arrangement 13 in the vertical direction. The arrangement for reducing air drag 60, 70, 80 are provided with air outlets 7 along the lower edges 11B of side skirts 19 of each side 4, 5. Each respective side skirt 19 provides an extension of the corresponding side 4, 5 of the cargo housing 16. The arrangement 60, 70, 80 for reducing air drag are provided with air inlets 6 in the front face of each side skirt 19.

Figure 4:
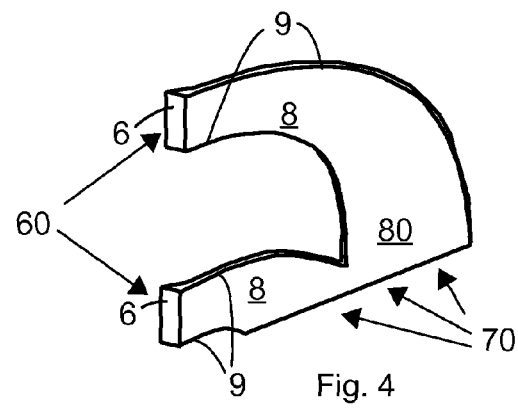
FIG. 4 illustrates features of means for receiving air and means for conveying air according to an embodiment of the invention.

FIG. 4 illustrates mainly the parts of the arrangement 60, 70, 80 for reducing air drag that are provided above the trailer connection 17 to screen off the space between the truck 100 and the trailer 10, i.e. the space above the truck 100 and below the trailer 10. FIG. 4 shows how the lateral width of the inlets 6, above the trailer connection 17, is decreasing in the direction of the air flow. The extended lateral widths of each inlet 6 provide a larger area being exposed to an oncoming air stream. Such inlets 6, having decreasing lateral width, may also be arranged in the front face of the side skirt 19. The air ducts 8 of the conveying means 80, above the truck connection 17 has, on the other hand, a smaller and constant lateral width so as not to interfere with a compartment for cargo inside the cargo housing 16. Thus, the inlet 6 is wider at the opening for receiving the air flow, and the inlet 6 is shaped with a narrowing portion, the end of which provides an entering into the conveying means 80 having the same width as the air ducts 8 of the conveying means 80. The width of the air ducts 8 of the conveying means 80 is constant, but the cross-section area of the air conveying means 80 increases in the direction of the air flow to provide a smooth air passage for the air flowing to the air ejecting means 70, which air ejecting means 70 extends along a main portion of the lower edge 11A above the truck connection 17.

Figure 5:
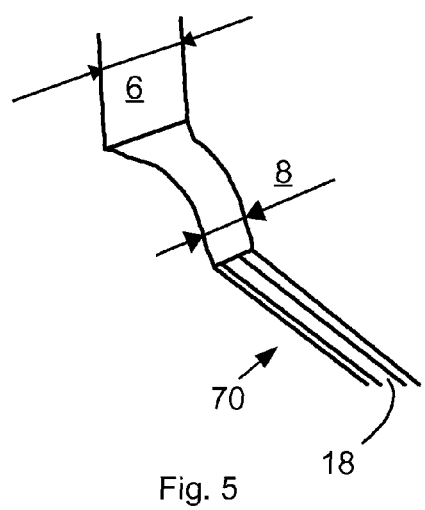
FIG. 5 illustrates details of an air inlet, an air duct and air ejecting means according to an embodiment of the invention.

FIG. 5 is a perspective view of a portion of the underside of the arrangement 60, 70, 80 for reducing air drag illustrated in FIG. 4. FIG. 5 especially shows an embodiment, wherein the air ejecting means 70 are provided with an outlet 7 opening having a smaller width than the air ducts 8 of the air conveying means 80 in order to increase the speed of the air flowing from the air ejecting means 70. The outlet 7 of this embodiment is provided with a width-reducing elongated slot 18 extending in the longitudinal direction of the trailer 10 body 1. Such a width-reducing elongated air slot 18 may also be provided in outlets 7 arranged in the side skirts 19.

Figure 6:
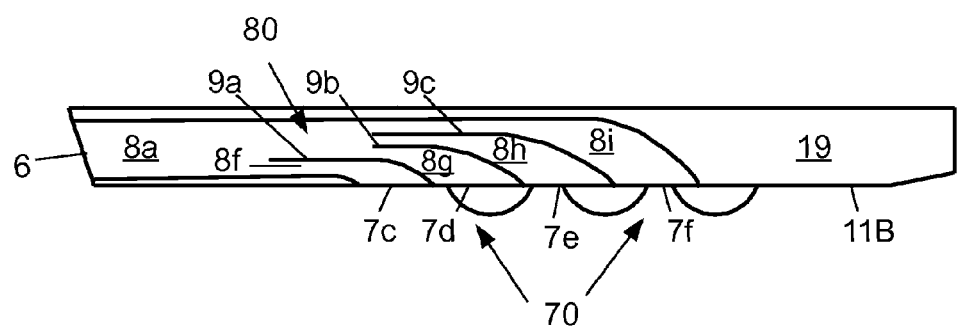
FIG. 6 illustrates means for conveying air according to an embodiment of the invention.

FIG. 6 illustrates an embodiment of the arrangement 60, 70, 80 for reducing air drag, and especially an embodiment of the air conveying means 80 in a side skirt 19. The illustrated arrangement exits through the lower edge 11 of the side skirt, wherein the air is ejected along a portion 11B extending from a position in front of the wheel arrangements 13, partly extending on the outside of the wheel arrangements 13, ending at a position at the rearmost wheels of the wheel arrangements 13. The air conveying means 80 is provided with a number of air ducts 8, numbered 8*a*, 8*f*, 8*g*, 8*h*, and 8*i*. Closest to the inlet 6, a single first air duct 8*a* is arranged, which is divided by means of a first flow dividing wall 9*a* into two air ducts, the first air duct 8*a* and a second air duct 8*f*. The first air duct 8*a* is divided once again by means of a second 9*b* and a third 9*c* flow dividing wall into three air ducts; i.e. a third air duct 8*g*, a fourth air duct 8*h*, and a fifth air duct 8*i*. The second to fifth air ducts 8*f-i* directs and conveys the air flow downwards towards a respective one of four separate outlets 7*c-f* of the air ejecting means 70, all separate outlets 7*c-f* being arranged in the lower edge 11B of the side skirt 19. Thus, an air flow entering one single inlet 6 is divided and separated into a number of air flows, each exiting a respective one of a plurality of outlets 7*c-f*. The channeling provided by the separating walls 9*a-c* provides a more controlled air flow, each separate air flow running through a respective air duct 8*f-l* that conveys the air flow in a direction towards the road. The separating walls 9*a-c* are arranged to provide an evenly distributed flow of air through the air ejecting means 70. Together the four outlets 7*c-f* provides an elongated wall of air covering the space between the side skirt 19 and the ground.

A similar arrangement to the embodiment of the air ducts 8 of FIG. 6 may alternatively be provided above the truck connection 17 of FIG. 1.

FIGS. 7 and 8*a-e* illustrate a preferred embodiment of an arrangement 60, 70, 80 for reducing air drag in accordance with the invention. The air receiving means 60, the air conveying means 80 and the air ejecting means 70 are arranged in a side skirt 19 of a trailer 10. The figures also illustrate an example of a side skirt 19 provided with air receiving means 60, air conveying means 80 and air ejecting means 70 that may be provided as a separate unit for attachment to a trailer 10.

In this embodiment the air receiving means 60, the air conveying means 80 and the air ejecting means 70 are provided as five separate sub units in the side skirt 19. Each sub unit comprises a respective air inlet 6, air duct 8 and air outlet 7. The side skirt 19 is arranged on the trailer 10, behind the truck 100, longitudinally along the body 1 of the trailer 10, and below the cargo housing 16. The side skirt 19 extends in the longitudinal direction of the trailer from a position close to the truck 100 substantially along the whole portion of the body 1 behind the truck 100 to the rear end of the trailer 10. The side skirt 19 extends vertically from the cargo housing 16 towards the road surface (not shown), ending above the road surface so as to still provide a ground clearance.

Figure 7:
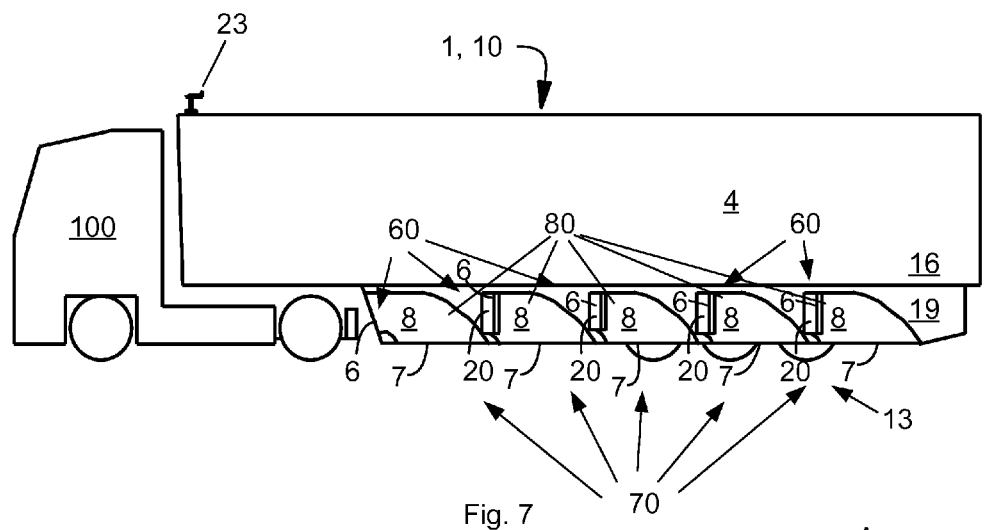
FIG. 7 illustrates an embodiment of an arrangement for reducing air drag incorporated in a side skirt.

FIG. 7 shows five sub units, wherein the four rearmost sub units are identical. The sub unit at the front of the side skirt 19 differ from the four other in having an inlet 6 that faces forward in the direction of travel. The four rearmost sub units are provided with a respective inlet 6 facing sideways, in the lateral direction of the trailer out from the (first) side 4 of the trailer 10. Although not illustrated, a corresponding side skirt, having five corresponding sub units, is arranged in the second side of the trailer. Each of the rearmost sub units is provided with a valve 20 for selectively receiving air through the corresponding inlet 6. The trailer 10 is also provided with a wind sensing arrangement comprising a wind direction indicator 23.

FIG. 8*a*-8*e* illustrates embodiments of details of the embodiments of FIG. 7.

Figure 8A:
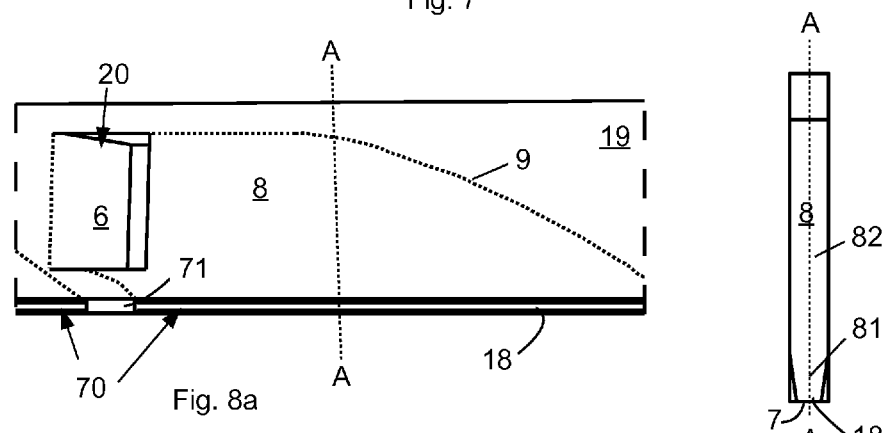
FIGS. 8a-e illustrates features of the embodiment of FIG. 7, which features may also be included in the embodiments of FIGS. 1-6.

FIG. 8*a* illustrates a portion of the side skirt 19 provided with one sub unit having a side facing inlet 6. The inlet 6 is provided with a valve 20 that has been opened to let air into the corresponding air duct 8 of the air conveying means 80. The walls 9 of the air duct 8 is shown in broken lines. FIG. 8*a* is a perspective view showing the underside of the side skirt 19. The air ejecting means 70 are provided with a longitudinally extending air slot 18 that reduces the area of the air passage to increase the speed of the ejected air. FIG. 8*a* also shows a portion of an air outlet 7 of a neighboring sub unit, which outlet is arranged to eject air close to the air outlet 7 of the illustrated sub unit. The air outlets 7 of consecutive sub units are arranged to provide a common air screen along all the five sub units. The air outlets 7 are separated by only a relatively small bottom wall portion 71 of the side skirt 19, and together the outlets 7 form an almost continuously extending air slot 18. The portion 71 of the bottom wall that separates consecutive outlets 7 is made small so that a substantially continuous air screen is provided that extends in the longitudinal direction along the lower edge 11B of the side skirt and vertically to the road surface.

Figure 8B:
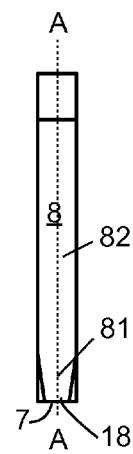

FIG. 8*b* illustrate a cross section along line A-A of FIG. 8*a*. The air duct 8 is provided with a transition portion 81, wherein the lateral width of the air duct, in the lateral direction of the trailer, is narrowed in the air flow direction towards the air outlet 7. The transition portion 81 is narrowed from the width of a main portion 82 of the air duct 8 to the width of the air slot 18 in the air outlet 7. The main portion 82 of the air duct 8 has a constant width from the air inlet 6 to the transition portion 81.

Figure 8C:
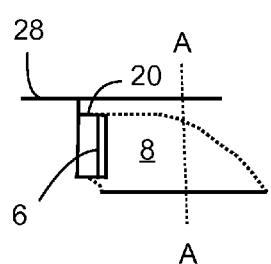

FIG. 8*c* illustrate features of the sub unit shown in FIGS. 8*a* and 8*b*. The valve 20 of the inlet 6 are connected to a linking system 28 for selectively opening and closing the air inlet 6 leading into the air channel 8.

Figure 8D:
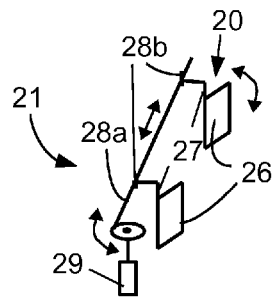
Figure 8E:
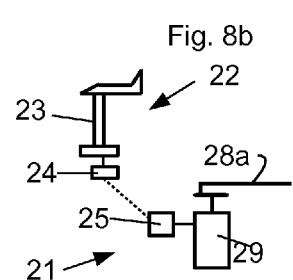

FIGS. 8*d* and 8*e* illustrate further means for controlling the valves 20 of the inlets 6. FIG. 8*d* shows the valves 20 in more detail, each valve comprising a respective flap 26 arranged on a shaft 27, which shaft is rotatable about its longitudinal axis. FIG. 8*d* illustrates means 21 for adjusting the valves. The valve control means 21 comprises the linking system 28 by means of which the valve control means are operatively connected to open and close the valves 20. The linking system 28 comprises a rod 28*a* and hinge connections 28*b* to the respective shafts 27 of each valve 20 flap 26. The valve adjusting means 21 also comprises a drive motor 29 operatively connected to the linking system 28. The linking system 28 is arranged to connect the drive motor 29 to all valves 20 of the inlets 6 of the side skirt. The linking system 28 is configured to transfer a rotary motion from the drive motor 29 to a rotary motion of each flap 26, where the motion is transferred as a translational movement of the rod 28*a* in the longitudinal direction of the side skirt 19. This arrangement provides a non-complicated way of controlling the movement of valve flaps 26.

In an alternative embodiment, a separate drive motor 29 is connected to each valve 20.

FIG. 8*e* shows an embodiment of how the valve adjusting means 21 is operatively connected to the side wind sensing arrangement 22. The valve adjusting means 21 comprises a control unit 25 communicating with a control unit 24 of the side wind sensing arrangement 22, which control unit 24 receives signals, indicative of side wind, from the wind direction indicator 23.

The control unit 25 of the valve adjusting means is provided with software for controlling the valves 20 on the basis of the side wind. Preferably, the control unit 25 is adapted to only open valves 20 on the windward side of the trailer 10, keeping the valves closed on the leeward side. Thus, the valves 20 are only opened when experiencing side wind. Preferably also, the valves 20 are only opened when the side wind exceeds a pre-defined threshold angle. The valves may be opened only partly, which partly opening of the valves is made on the basis of the side wind. For example, the valves are only partly opened when the first threshold angle is reached, and are not fully opened until a second threshold angle is reached. The adjusting of the valves can be step-wise from a minimum opening at the first threshold to fully opened at the second threshold, each step governed by reaching a threshold for that step, such as a third, a fourth and a fifth threshold for a first, a second and a third intermediate step between the minimum opening to the fully opened valve.

The flap 26 of the valve 20 is suitably made essentially planar so as to make a good fit with the planar side surface of the side skirt 19 when the valve is closed.

Valves 20 may be arranged in every forward facing inlet 6 described in FIGS. 1-7. Although, the control of the valves 20 have been exemplified for the side facing valves of FIGS. 7 and 8, the same adjustments may be made for the valves 20 of inlets 6 that face forward.

Moreover, a wind sensing arrangement may be provided on the truck 100, in which case the valve adjusting means 21 may be adapted for connection to, and communication with, a communication system of the truck 100, such as a communication bus, and wherein the valve adjusting means 21 may adjust the valves 20 on the basis of side wind information received from the truck 100.

Also, the air duct 8 provided with a narrowing portion 81 was described with reference to the air duct 8 of FIG. 8, but it should be noted that such a narrowing portion 81, and main portion 82, may be provided in every air duct of the embodiments.

FIG. 9 illustrates further features and embodiments.

FIG. 9*a* illustrates an embodiment wherein the side skirt 19 extends along the trailer 10 sides 4, 5, between the truck 100 and the wheel arrangements 13. Means for receiving air including two air inlets 6 is arranged in the cargo housing 16, a first air inlet 6 facing forward and a second air inlet 6 facing sideward. Means for receiving air are also arranged in the side skirt 19, a first air inlet facing forward, and a second and a third air inlet facing sideward. The air drag reducing arrangements integrated in the cargo housing 16 and the side skirt 19 of the embodiment of FIG. 9*a* consists of sub arrangements arranged in sequence along the side of the body 16, 19. Each sub arrangement having a single air inlet 6, a single air outlet 7 and a single air duct 8 connecting, and providing an air passage between, the single air inlet 6 and the single air outlet 7.

FIG. 9*b* illustrates the trailer 10 of the embodiment of FIG. 9*a* in a view from behind. The trailer 10 is provided with one side skirt 19 on each side that extends downwards from the cargo housing 16, and which side skirts 19 are arranged in front of the wheel arrangements 13. The side skirts 19 are arranged to provide a planar extension of each side surface (4, 5) tangentially and vertically downwards from the cargo housing 16.

FIG. 9c also illustrates a trailer 10 in a view from behind. FIG. 9c illustrates an alternative embodiment to the embodiment of FIG. 9b wherein the side skirts 19 are arranged on the outside of at least one of the wheel arrangement 13. As in the embodiment of FIG. 9b, the side skirts 19 are arranged to provide a planar extension of each side surface 4, 5 of the cargo housing 16 tangentially and vertically downwards from the cargo housing 16.

FIG. 9d illustrates an embodiment of some features of side skirts 19 in a view showing the underside of the cargo housing 16. This embodiment of the side skirts 19 comprises a front portion 19b slightly angled inwards. The main portion 19a of each side skirt 19 is straight in the longitudinal direction. It is preferred that at least a main portion 19a of each side skirt 19 provide a planar extension of the walls of each respective side 4, 5 of the cargo housing 16. However a minor portion, especially a minor front portion 19b may extend inwards from the wall surfaces of the respective side 4, 5. FIG. 9d only illustrates a special configuration of the side skirts 19 and, for clarity purposes, other details, such as the wheel arrangements, the truck connection and the air ejecting means, are not illustrated in this view.

A number of embodiments have been illustrated to facilitate a man skilled in the art to make and use the invention. However the invention is not limited by these embodiments. The invention may be varied within the full scope of the claims.

Thus, a trailer 10 and a side skirt 19, each comprising an integrated arrangement 60, 70, 80 for reducing air drag, have been provided. Each arrangement 60, 70, 80 comprises means for receiving air 60 comprising at least one air inlet 6, means for ejecting air 70 comprising at least one air outlet 7 facing downwards. The means for ejecting air 70 are arranged along a lower edge 11 of the trailer cargo housing 16 and side skirt respectively. The arrangement also comprises means for conveying air 80 comprising at least one air duct 8. The means for conveying air 80 extend between the air receiving means 60 and the air ejecting means 70. The arrangement 60, 70, 80 is configured to produce a screen of air from the lower edge 11 and downwards during travel. The air screen prevents air, especially side wind, from entering the undercarriage. Especially the arrangement 60, 70, 80 in the cargo housing 16 prevents air from entering in the gap between the truck and trailer at the connection 17 between the truck and trailer, and the arrangement of the side skirt 19 prevents air from entering in the gap between the side skirt 19 and the road.

The arrangements for reducing air drag have been illustrated as separate arrangements in the cargo housing 16 and the side skirt 19. It is indeed preferred to integrate one or more air drag reducing arrangements 60, 70, 80 in the side walls of a cargo housing 16, wherein each such arrangement in the cargo housing provides one or more air passages between its air inlet 6 or air inlets 6 and its air outlet 8 or air outlets 8. In the same way it is preferred to integrate one or more air drag reducing arrangements 60, 70, 80 inside trailer side skirts 19, wherein each such arrangement in each side skirt 19 provides one or more air passages between its air inlet 6 or air inlets 6 and its air outlet 7 or air outlets 7. Such separate arrangements may each comprise one or more air inlets 6, one or more air inlets 6 facing forward and/or one or more air inlets 6 facing sideward. Such separate arrangements 60, 70, 80 may each comprise one or more air ducts 8, providing one or more air passages to the air ejecting means 70 of the arrangement. Each separate arrangement 60, 70, 80 comprises one or more air outlets 8 facing downwards for providing an air screen from the lower edge of the arrangement by means of the airflow received from the at least one air inlet 6. For example, an embodiment may be provided by modifying the embodiment illustrated in FIG. 1, by adding at least one air inlet 6 in the side skirt 19 that faces sideward and/or at least one air inlet 6 in the cargo housing 16 that faces sideward.

The invention claimed is:

1. A trailer (10) for a truck, comprising a body (1) having a first side (4), and a second side (5), which first and second sides (4, 5) are essentially vertical and extends in the longitudinal direction of the body (1), and comprising an arrangement (60, 70, 80) for reducing air drag integrated in the body (1), the arrangement (60, 70, 80) for reducing air drag comprises at least one air inlet (6);
at least one air outlet (7) facing downwards, said at least one air outlet (7) being arranged along a lower edge (11) of one of the sides (4, 5) of the body (1); and
at least one air duct (8) that extends between the at least one air inlet (6) and the at least one air outlet (7) and provides at least one air passage from the at least one air inlet (6) to the at least one air outlet (7),
wherein the arrangement (60, 70, 80) for reducing air drag is configured to produce a screen of air from the lower edge (11) and downwards during travel,
wherein at least one air outlet (7) is designed as an elongated slot (18) extending in the longitudinal direction of the body (1).

2. The trailer (10) according to claim 1, wherein the trailer (10) comprises a truck connection (17) and wherein the at least one air outlet (7) is arranged along a first portion (11A) of the lower edge (11), which first portion (11A) extends above the truck connection (17).

3. The trailer (10) according to claim 2, wherein the at least one air outlet (7) extends a distance of between 1 m and 3 m along the first portion (11A) in the longitudinal direction of the body (1), and/or has a width of less than 10 cm, such as between 0.5 cm and 5 cm, in the lateral direction of the body (1).

4. The trailer (10) according to claim 2, wherein the arrangement (60, 70, 80) comprises a plurality of the air outlets (7) designed as elongated slots (18), and wherein the plurality of the air outlets (7) are arranged in sequence along the first portion (11A).

5. The trailer (10) according to claim 1, wherein the body (1) comprises a cargo housing (16) and a side skirt (19) arranged below the cargo housing (16) and wherein the at least one air outlet (7) is arranged along a second portion (11B) of the lower edge (11), which second portion (11B) is provided in the side skirt (19).

6. The trailer (10) according to claim 5, wherein the trailer (10) comprises at least one wheel arrangement (13), and the at least one air outlet extends along the second portion (11B) a distance of at least 1 m in front of the at least one wheel arrangement (13) in the longitudinal direction of the body (1).

7. The trailer (10) according to claim 5, wherein the trailer comprises at least one wheel arrangement (13), the side skirt (19) being arranged on the outer side of the at least one wheel arrangement (13), and wherein the second portion (11B) extends outside at least one wheel of the at least one wheel arrangement (13), especially outside the rearmost wheel of the wheel arrangement (13).

8. The trailer (10) according to claim 5, wherein the at least one air outlet (7) extends a distance of more than 50%, such as more than 80%, of the length of the side skirt (19)

in the longitudinal direction of the body (1); and/or has a width of less than 10 cm, such as between 0.5 cm and 5 cm, in the lateral direction of the body (1).

9. The trailer (10) according to claim 5, wherein the arrangement (60, 70, 80) comprises a plurality of the air outlets (7) designed as elongated slots (18), and wherein the plurality of the air outlets (7) are arranged in sequence along the second portion (11B).

10. The trailer according to claim 9, wherein arrangement (60, 70, 80) comprises a plurality of the air inlets (6) and a plurality of the air ducts (8), and wherein each one of the air ducts (8) is arranged to provide an air passage from a respective one of the air inlets (6) to a respective one of the air outlets (7).

11. The trailer according to claim 1, wherein the trailer (10) comprises a truck connection (17),
the body (1) comprises cargo housing (16) and a side skirt (19), which side skirt (19) is arranged below the cargo housing (16),
and wherein the at least one air outlet (7) is arranged along a first portion (11A) and along a second portion (11B) of the lower edge (11), which first portion (11A) extends above the truck connection (17) and which second portion (11B) is provided in the side skirt (19).

12. The trailer (10) according to claim 1, wherein at least one air duct (8) has a constant width in the lateral direction of the body (1), and wherein the width of at least one air outlet (7) is equal to the width of the air duct (8), so that an air passage of constant width is provided.

13. The trailer (10) according to claim 1, wherein at least a main portion (82) of at least one air duct (8) has a constant width in the lateral direction of the body (1), and wherein the width of at least one air outlet (7) is smaller than the width of the main portion, so that a narrowing air passage is provided.

14. The trailer (10) according to claim 13, wherein a transition portion (81) is provided between the main portion (82) and the at least one air outlet (7) having a width smaller than the main portion (82).

15. The trailer (10) according to claim 1, wherein the at least one air inlet (6) is provided with a valve (20), and said trailer (10) comprising an adjusting assembly (21), that is operably connected to the valve (20) and arranged to selectively admit air to enter into and flow through the air duct (8).

16. The trailer (10) according to claim 15, wherein the adjusting assembly (21) is adapted to control the valve (20) as a response to an indication of side wind provided by a wind sensing arrangement (22).

17. The trailer (10) according to claim 16, wherein the adjusting assembly (21) is adapted to open the valve (2) when the wind sensing arrangement (22) indicates that the air inlet (6) is located at the windward side of the trailer (10).

18. The trailer (10) according to claim 17, wherein the adjusting assembly (21) is adapted to partly open the valve (6) when the wind sensing arrangement (22) indicates that the side wind exceeds a pre-defined first threshold angle.

19. The trailer (10) according to claim 16, wherein the adjusting assembly (21) is adapted to fully open the valve (6) when the wind sensing arrangement (22) indicates that the side wind exceeds a pre-defined second threshold angle.

20. A side skirt (19) for attachment below a cargo housing (16) of a trailer (10) to prevent air from entering below the cargo housing (16) and create air drag by interfering with the undercarriage of the trailer (10), said side skirt (19) being provided with an arrangement (60, 70, 80) for reducing air drag, which arrangement (60, 70, 80) is integrated into the side skirt (19) and comprises:
at least one air inlet (6);
at least one air outlet (7) facing downwards, said at least one air outlet (7) being arranged along a portion (11B) of a lower edge (11) of the side skirt (19); and
at least one air duct (8) extending between the at least one air inlet (6) and the at least one air outlet (7) and providing at least one air passage from the at least one air inlet (6) to the at least one air outlet (7),
wherein the arrangement (60, 70, 80) for reducing air drag is configured to produce a screen of air during travel with the side skirt (19) attached to a trailer (10), which screen of air extends from the lower edge portion (11B) towards a road surface.

21. The side skirt (19) according to claim 20, wherein the at least one air outlet (7) extends a distance of more than 50%, such as more than 80%, of the length of the side skirt (19) in the longitudinal direction of the side skirt (19); and/or has a width of less than 10 cm, such as between 0.5 cm and 5 cm in the lateral direction of the side skirt (19).

22. The side skirt (19) according to claim 20, wherein the arrangement (60, 70, 80) comprises a plurality of the air outlets (7) designed as elongated slots (18), and wherein the plurality of the air outlets (7) are arranged in sequence along the lower edge portion (11B).

23. The side skirt (19) according to claim 22, wherein the arrangement (60, 70, 80) comprises a plurality of the air inlets (6), and comprises a plurality of the air ducts (8), and wherein each one of the air ducts (8) is arranged to provide an air passage from a respective one of the air inlets (6) to a respective one of the air outlets (7).

24. The side skirt (19) according to claim 20, wherein at least one air duct (8) has a constant width in the lateral direction of the body (1), and wherein the width of at least one air outlet (7) is equal to the width of the air duct (8), so that an air passage of constant width is provided.

25. The side skirt (19) according to claim 20, wherein at least a main portion (82) of at least one air duct (8) has a constant width in the lateral direction of the body (1), and wherein the width of at least one air outlet (7) is smaller than the width of the main portion, so that a narrowing air passage is provided.

26. The side skirt (19) according to claim 25, wherein a transition portion (81) is provided between the main portion (82) and the at least one air outlet (7) having a width smaller than the main portion (82).

27. The side skirt (19) according to claim 20, wherein the at least one air inlet (6) is provided with a valve (20), and wherein the side skirt (19) comprises an adjusting assembly (21) that is operably connected to the valve (20) and arranged to selectively admit air to enter into and flow through the air duct (8).

28. The side skirt (19) according to claim 27, wherein the adjusting assembly (21) is adapted to control the valve (20) as a response to an indication of side wind provided by a wind sensing arrangement (22).

29. The side skirt (19) according to claim 28, wherein the adjusting assembly (21) is adapted to open the valve (2) when the wind sensing arrangement (22) indicates that the air inlet (6) is located at the windward side of the trailer (10).

30. The side skirt (19) according to claim 29, wherein the adjusting assembly (21) is adapted to partly open the valve (6) when the wind sensing arrangement (22) indicates that the side wind exceeds a pre-defined first threshold angle.

31. The side skirt (19) according to claim 28, wherein the adjusting assembly (21) is adapted to fully open the valve (6)

when the wind sensing arrangement (22) indicates that the side wind exceeds a pre-defined second threshold angle.

32. A trailer (10) for a truck, comprising a body (1) having a first side (4), and a second side (5), which first and second sides (4, 5) are essentially vertical and extends in the longitudinal direction of the body (1), and comprising an arrangement (60, 70, 80) for reducing air drag integrated in the body (1), the arrangement (60, 70, 80) for reducing air drag comprises
- at least one air inlet (6);
- at least one air outlet (7) facing downwards, said at least one air outlet (7) being arranged along a lower edge (11) of one of the sides (4, 5) of the body (1); and
- at least one air duct (8) that extends between the at least one air inlet (6) and the at least one air outlet (7) and provides at least one air passage from the at least one air inlet (6) to the at least one air outlet (7),
- wherein the arrangement (60, 70, 80) for reducing air drag is configured to produce a screen of air from the lower edge (11) and downwards during travel, wherein at least one air duct (8) has a constant width in the lateral direction of the body (1), and wherein the width of at least one air outlet (7) is equal to the width of the air duct (8), so that an air passage of constant width is provided.

33. A trailer (10) for a truck, comprising a body (1) having a first side (4), and a second side (5), which first and second sides (4, 5) are essentially vertical and extends in the longitudinal direction of the body (1), and comprising an arrangement (60, 70, 80) for reducing air drag integrated in the body (1), the arrangement (60, 70, 80) for reducing air drag comprises
- at least one air inlet (6);
- at least one air outlet (7) facing downwards, said at least one air outlet (7) being arranged along a lower edge (11) of one of the sides (4, 5) of the body (1); and
- at least one air duct (8) that extends between the at least one air inlet (6) and the at least one air outlet (7) and provides at least one air passage from the at least one air inlet (6) to the at least one air outlet (7), wherein the arrangement (60, 70, 80) for reducing air drag is configured to produce a screen of air from the lower edge (11) and downwards during travel,
- wherein at least a main portion (82) of at least one air duct (8) has a constant width in the lateral direction of the body (1), and wherein the width of at least one air outlet (7) is smaller than the width of the main portion, so that a narrowing air passage is provided.

34. A trailer (10) for a truck, comprising a body (1) having a first side (4), and a second side (5), which first and second sides (4, 5) are essentially vertical and extends in the longitudinal direction of the body (1), and comprising an arrangement (60, 70, 80) for reducing air drag integrated in the body (1), the arrangement (60, 70, 80) for reducing air drag comprises
- at least one air inlet (6);
- at least one air outlet (7) facing downwards, said at least one air outlet (7) being arranged along a lower edge (11) of one of the sides (4, 5) of the body (1); and
- at least one air duct (8) that extends between the at least one air inlet (6) and the at least one air outlet (7) and provides at least one air passage from the at least one air inlet (6) to the at least one air outlet (7), wherein the arrangement (60, 70, 80) for reducing air drag is configured to produce a screen of air from the lower edge (11) and downwards during travel,
- wherein the at least one air inlet (6) is provided with a valve (20), and said trailer (10) comprising an adjusting assembly (21), that is operably connected to the valve (20) and arranged to selectively admit air to enter into and flow through the air duct (8).

\* \* \* \* \*